June 13, 1961

A. F. AMELIO 2,987,935

THROTTLE CONTROL

Filed March 3, 1960

INVENTOR.
Armand F. Amelio
BY
Arthur M. Collins
Attorney

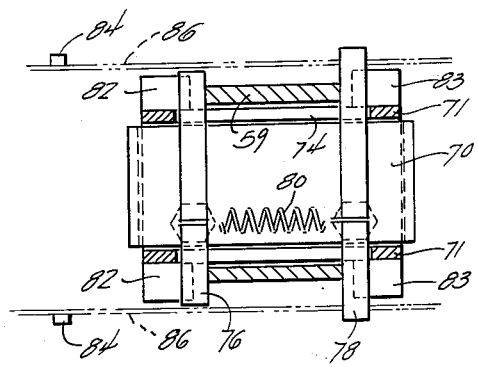
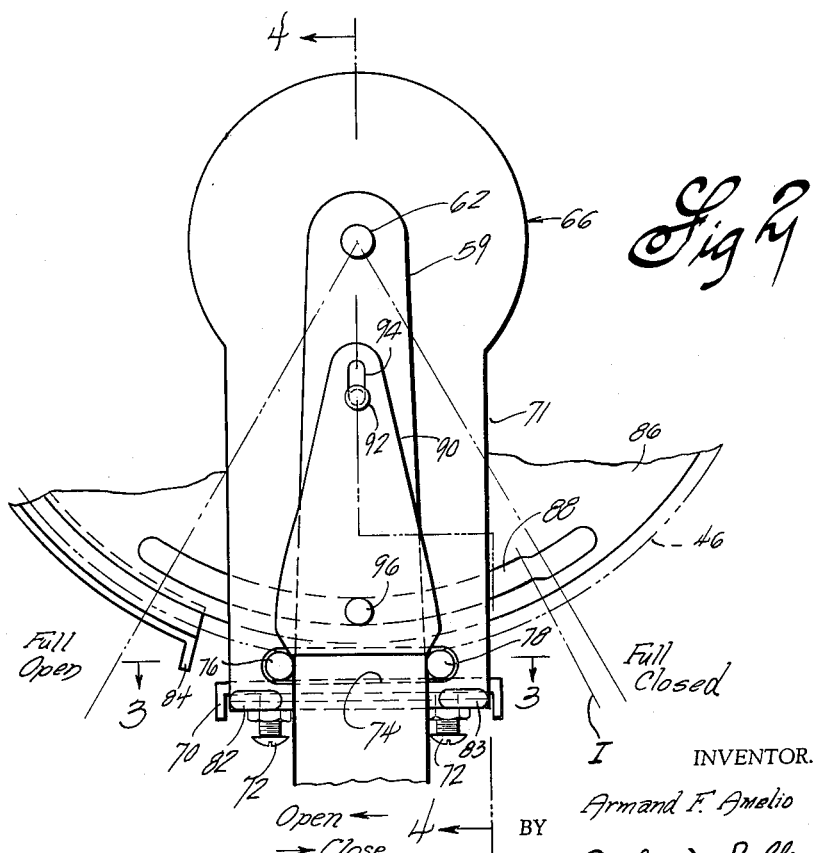

June 13, 1961 A. F. AMELIO 2,987,935
THROTTLE CONTROL
Filed March 3, 1960 3 Sheets-Sheet 3

INVENTOR.
Armand F. Amelio
BY Arthur L. Collins
Attorney

United States Patent Office 2,987,935
Patented June 13, 1961

2,987,935
THROTTLE CONTROL
Armand F. Amelio, New York, N.Y., assignor to the United States of America as represented by the Secretary of the Navy
Filed Mar. 3, 1960, Ser. No. 12,651
2 Claims. (Cl. 74—480)

This invention relates to helicopters and particularly to throttle controls for such craft that are equipped with multi-engines.

The speed of the engine or engines powering a helicopter's rotor is adjusted by turning a twist grip located near or on the collective pitch stick. Movement of the twist grip either advances or retards the engines' throttles simultaneously depending on the direction in which it is turned. This is the normal throttle control used for starting the engines and providing them and the rotor with a preselected speed.

The collective pitch stick, although it has the primary function of collectively changing the inclination of the rotor blades as is required for vertical flight, is also connected to the engines' throttles in order that a necessary throttle change is made with a given pitch setting so as to supply the proper power and thereby maintain more or less a constant rotor speed.

With multi-engine powered rotors, the presently used collective pitch stick and twist grip throttles cause both engines to respond together approximately the same amount. Individual throttle control of each engine thereby is impossible and, consequently, independent starting or stopping of engines is unattainable. Likewise, the engine outputs may be mismatched because of inherent differences between fuel systems, differences in wear of parts, etc., and synchronization of their outputs cannot be obtained with these controls.

It is therefore an object of this invention to provide a throttle arrangement for use in multi-engine helicopters which will permit independent starting, stopping, and intermediate operation of each engine.

Another object of this invention is to insert a device into a throttle system for use in a multi-engine helicopter which will permit independent control of the engines while at the same time retaining the collective throttle action of the twist grip and collective pitch stick.

Another object of this invention is to provide disengagement features between the individual throttle controls to each engine and the collective throttle controls to which they are interconnected so that full throttle or full retard of all engines is possible from the collective controls even though individual throttle controls are set at different amounts of throttle.

Further objects of the invention will become apparent from a study of the following description taken together with the accompanying drawing, wherein:

FIG. 2 is a side elevational view of one of the throttle quadrants of FIG. 1, with parts broken away, showing the position of elements when the pitch and throttle pulleys are clutch engaged with each other;

FIG. 3 is a cross-sectional view taken on line 3—3 of FIG. 2; and

Figure 1:
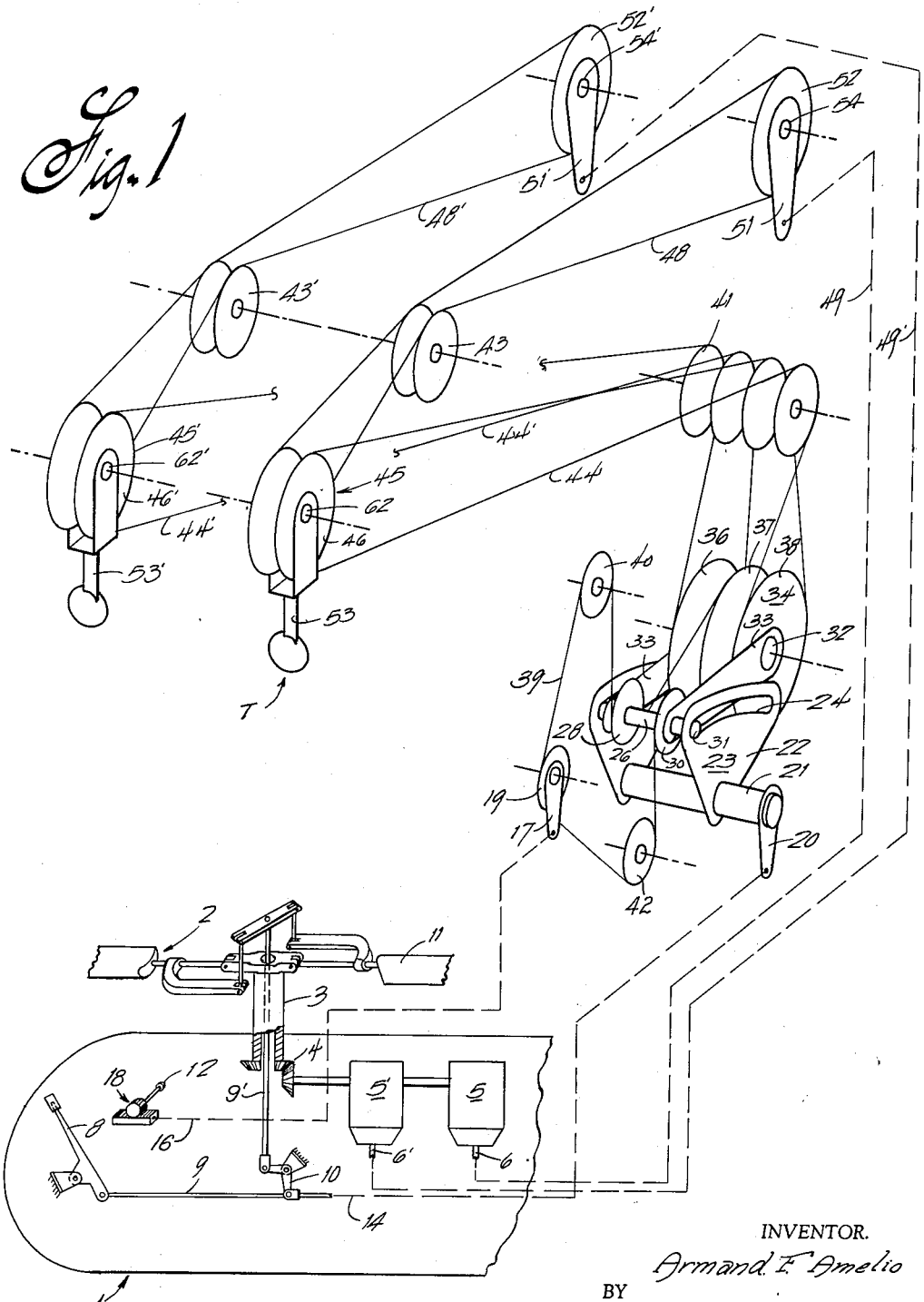
FIG. 1 is a schematic view of the throttle arrangement showing its relation to the various parts of a helicopter.

Referring to the drawing, the numeral 1 indicates a portion of a helicopter having a rotor 2 on an upright shaft 3 which is coupled by some suitable gearing 4 to receive power from prime movers, 5 and 5', such as jet engines, having throttle valves 6 and 6'. Although prime movers 5 and 5' are shown in FIG. 1 as apparently being mechanically coupled to each other, they are, nevertheless, intended to be independent sources by which power may be applied to rotor 2. A collective pitch stick 8 is suitably connected to the rotor blades 11 through linkage 9 and 9' and crank 10, so that the inclination of the rotor blades 11 may be varied with movement of the stick as is desired for vertical flight. The pitch stick 8 and a twist grip throttle 12 are connected by links 14 and 16, respectively, through a throttle system generally indicated by T, the details of which will be described hereinafter, to the prime movers' throttle valves 6 and 6' so that movement of either the twist grip 12 or pitch stick 8 will simultaneously advance the prime movers' throttles.

Twist grip 12 is shown located near the collective pitch stick and to be connected to link 16 through a pinion and rack arrangement 18 wherein rotation of the grip moves the rack for transmission of motion into the throttle system T. It may take other forms and likewise be suitably located on the collective pitch stick 8. The normal function of the twist grip is to simultaneously actuate all engine throttles, but it is incapable of controlling them individually.

The throttle system T has a drive wheel, shown as a sheave or pulley 19, with an arm 17 secured to it to which the twist grip link 16 is connected, and a crank 20 to which link 14 from collective pitch stick 8 is coupled. Crank 20 is fixed to a rotatable shaft 21 as are a pair of spaced vertical plates, 22 and 22, of a cam sector 23. A cam slot 24 is provided in each plate 22. The slots 24 are opposed and on a line parallel to the axis of shaft 21.

A movable drum 26 having a pair of pulleys 28 and 30 secured for unitary movement is rotatably mounted on a shaft 31 and disposed between the plates of cam sector 23. The shaft 31 is supported at its ends in the slots 24 and 24 and also coupled to a fixed parallel shaft 32 by a pair of links 33 and 33 that are free to rotate about shaft 32. A drum 34 is rotatably mounted between the ends of links 33 and 33 on fixed shaft 32; it has provisions for three drive belts, which may be grooves in the drum or, as shown, a plurality of joined pulleys 36, 37 and 38. Drums 26 and 34 can rotate about their axes, and drum 26 can restrictedly move about drum 34, therefore, drum 26 will be referred to hereafter as movable and drum 34 as a fixed drum.

An endless drive belt or cable 39 drive couples twist grip pulley 19 to fixed drum 34; it passes over an idler pulley 40, over the under side of groove or pulley 28 of movable drum 26, over the top of the groove or pulley 37 of drum 34, then over the top of groove or pulley 30 of movable drum 26, around idler pulley 42, and back to twist grip drive pulley 19.

Partial rotation of twist grip pulley 19 by action from twist grip 12 is converted to motion of belt 39 which is transmitted to rotation of fixed drum 34, while movable drum 26, although it rotates, retains its position relative drum 34. Likewise, motion of cam sector 23 through action from collective pitch stick 8 raises or lowers movable drum 26 about fixed drum 34 causing movement of the portion of the belt passing around both drums and consequently rotating drum 34.

An endless belt 44 drive connects fixed drum 34 with pitch pulley 46 in throttle quadrant 45, and an endless belt 48 couples throttle pulley 50 in throttle quadrant 45 to pulley 52 which is rotatably supported on a shaft 54. Idler pulleys and drums 41 and 43 are provided as may be necessary for changing direction or supporting belts 44 and 48. The pulley 52 has an arm 51 secured to it and connected by linkage 49 to throttle valve 6. A throttle lever or arm 53, connected to quadrant throttle pulley 50, is provided in order to rotate pulley 52 and vary throttle 6 thereby, independently of motion from fixed drum 54. The construction and manner of operation will be described hereafter.

In the throttle quadrant 45, pitch pulley 46 is disengageably connected to throttle pulley 50, so that rotative movement of fixed drum 34 originating with motion of collective pitch stick 8 or twist grip 12 will be transmitted through quadrant 45 to the throttle valve 6, and rotative movement of throttle pulley 50 originating with motion of quadrant throttle arm 53 will disengage throttle pulley 50 from pitch pulley 46 and motion is transmitted only forward to the throttle valve 6.

A second throttle quadrant 45′ is provided for prime mover 5′. It is similarly constructed and connected as quadrant 45; therefore, the elements of quadrant 45′ are indicated with the same numerals as for quadrant 45 but with a prime mark. Since both quadrants 45 and 45′ are similar, the construction and operation of only quadrant 45 will be described.

Figure 4:
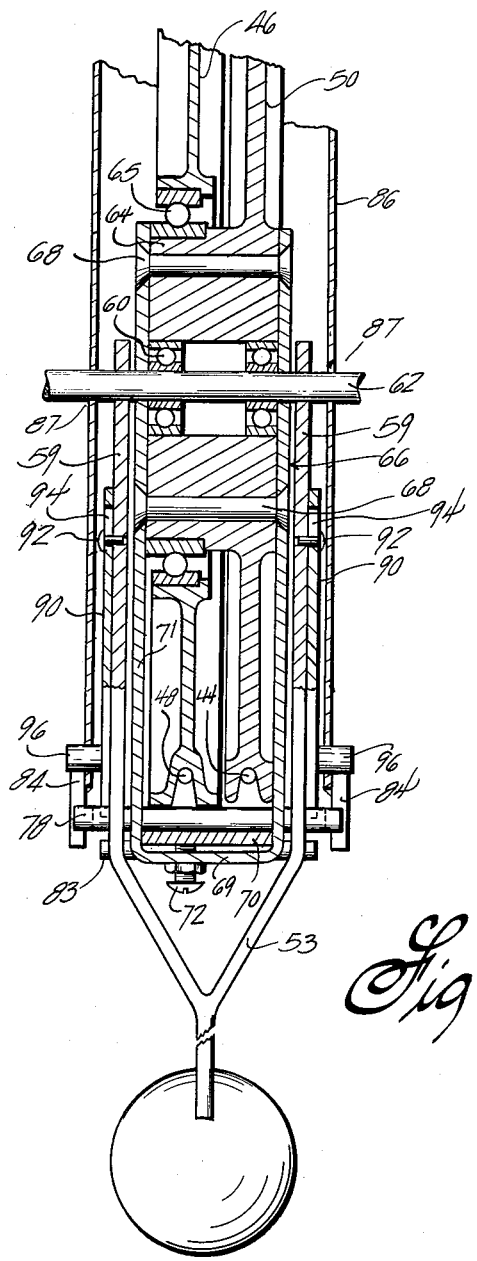
FIG. 4 is another cross-sectional view taken on line 4—4 of FIG. 2.

In order to provide the disengagement function between the quadrant's throttle pulley 50 and pitch pulley 46, the throttle pulley 50 is rotatably mounted on a fixed shaft 62 by means of bearing 60 (FIG. 4). The hub of throttle pulley 50 extends axially from one end face forming an extension 64 on which pitch pulley 46 is superimposed and rotatably mounted by bearing 65. Also the diameter of control pulley 46 is larger than that of throttle pulley 50. A cage 66 U-like in shape is suspended from and secured to the hub of throttle pulley 50 by rivets or other fastening means 68. The horizontal bight portion 69 of the cage 66 extends axially across the peripheral faces of the pulley 46 and 50 and is spaced therefrom. A platform 70 rests on the bight portion 69 and is movable vertically, that is, radially with respect to the pulleys 46 and 50, by bolts 72 threaded in the bight. The legs 71 and 71 of the cage 66 have opposed slots 74 and 74 (FIG. 2) that extend substantially across the cage width, that is, along a chord passing through pulley 46. A pair of clutch pins 76 and 78 are supported on the platform 70 with their ends in the slots 74 and 74. The pins 76 and 78 are joined by a tension spring 80 (FIG. 3) which urges them together and wedges them between the peripheral face of pitch pulley 46 and platform 70 (FIG. 4), but not with throttle pulley 50, since its diameter is sufficiently smaller so that its peripheral face freely clears the pins.

Throttle arm 53 is bifurcated and pivotally mounted at the ends of its legs 59 and 59 on fixed shaft 62. Throttle pulley 50 and pitch pulley 46 are disposed between the legs of throttle arm 53, that is, the legs 59 and 59 extend downwardly along the outer end faces of the pulleys 46 and 50 and pass between the clutch pins 76 and 78 which are normally drawn against the sides of the legs 59 and 59 by spring 80. Limit stops 82 and 83 (FIGS. 2 and 3) are secured to the outer sides of legs 71 and 71 of cage 66 at a slight distance away from the legs of throttle arm 53, for instance, 1/16 of an inch, and are adapted to be engaged by arm 53 when throttle is applied thereby.

It is evident from the construction described that throttle movement initiated at collective pitch stick 8 or twist grip 12 will cause corresponding motion of the pitch pulley 46. Furthermore, clutch pins 76 and 78 normally being wedged between platform 70 and pitch pulley 46, the motion of the pitch pulley 46 will correspondingly move throttle pulley 50 and throttle arm 53. On the other hand, throttle action initiated at one of the quadrants with movement of a throttle arm 53 toward open throttle, clockwise as shown by the arrows on FIG. 2, will dislodge pin 76 from between the face of pulley 46 by arm 53 which will then, after it is moved approximately 1/16 of an inch, impinge on limit stop 82. Thereafter, arm 53 will carry cage 66 and throttle pulley 50, but it is freed from the frictional lock to pitch pulley 46. The amount of frictional lock between the pitch pulley 46 and pins 76 and 78 may be varied by adjusting the screws 72 in platform 70 which supports them. Thus, it is seen that the construction described provides manual throttle action independent of the pitch and twist grip controls. Furthermore, since a separate quadrant 45′ and arm 53′ is provided for each engine, differential engine operation is permissible which may be required to maintain equal output in a twin-engine system.

In order to permit a further increase of collective pitch of the rotor blade by the flight control or collective pitch stick 8 under conditions where throttle arm 53 is set at the full throttle position, which is indicated by the radial line in FIG. 2, it is necessary that the aft pin 78 be disengaged, since the pitch pulley 46 is rotated clockwise with increase of pitch by pitch stick 8. For this purpose, the forward pin 76 is shorter in length than pin 78 (FIG. 3) and a pair of overtravel stops 84 and 84 are mounted on either side of pulley 46 and 50 at the full throttle point. The length of pins 76 and 78 is such that the increase of throttle, i.e. clockwise motion of pulley 50, the forward pin 76 will clear the overtravel stops 84 and 84, whereas at full throttle, the aft pin 78 will impinge on the stops 84 and 84 and be disengaged thereby. However, if pitch is decreased by pitch stick 8, then pitch pulley 46 will rotate counter-clockwise and forward pin 76 will lock pitch pulley 46 to throttle pulley 50 by way of the platform 70 and cage 66, so that the cage and arm 53 are carried counterclockwise toward retard.

The overtravel stops 84 and 84 have the form of flanges on a casing 86 that covers the outer ends of pulleys 46 and 50 and which is secured, as by a weld 87 to the shaft 62.

If the outputs of the engines 5 and 5′ are not synchronized in a given pitch or flight condition, it is evident from the previous description that synchronization may easily be obtained by adjustment of either throttle arm 53. Furthermore, if this results in a staggering of the arms 53 and full open throttle of both engines is necessary by movement of pitch stick 8 or twist grip 12, the advanced throttle arm 53 of the staggered pair will not prevent the application of full throttle to the other engine. This is so, since advance throttle action from pitch stick 8 or twist grip 12, though it will simultaneously move both throttle arms 53, the more advanced arm 53′ will reach the overtravel stop 84 first and disengage from its quadrant's pitch pulley 46, thus, permitting the trailing arm 53 on the other quadrant to come up to full throttle and the overtravel stop 84. This disengagement, in addition, obviates damage to the quadrant having the advanced throttle arm 53 through excessive force which otherwise would be enhanced at pitch stick 8 or twist grip 12 in an effort to get full throttle from both engines.

Similarly, where the quadrant throttle arms 53 are staggered and collective throttle retarding action is applied, provision is made for disengaging the pitch and throttle pulleys 46 and 50 from each other at a time when the throttle arm 53 reaches the idle position. The construction, FIG. 2, shows that either end of casing 86 has an arcuate camming slot 88 which curves downward at the idle position which is indicated with a radial line I. A camming wedge 90 is suspended from the outer sides of each of the legs of throttle arm 53 on a lug 92 extending from the leg into a vertical slot 94 within the wedge 90. The base of wedge 90 is adapted to ride on clutch pins 76 and 78 when the throttle is above idle. A cam follower or lug 96 on wedge 90 extends into the casing cam slot 88. The action of the wedge 90 is such that it is forced down between the clutch pins 76 and 78 when throttle is retarded to idle or lower, and thereby free the quadrant's pitch pulley 46 from throttle pulley 50. Obviously, this permits full retarding of throttle of all engines even from the pitch stick 8 or twist grip 12.

Obviously many modifications and variations of the present invention are possible in the light of the above teachings. It is therefore to be understood that within the scope of the appended claims the invention may be practiced otherwise than as specifically described.

What is claimed is:

1. A throttle quadrant for varying the throttle valve setting of a helicopter power plant comprising a shaft, a throttle pulley adapted to be connected to said throttle valve for transmission of motion thereto having a hub extension on an end face thereof and rotatably mounted on said shaft, a pitch pulley of smaller diameter than said throttle pulley rotatably mounted on said hub extension, a cage secured to said throttle pulley having a portion extending axially across the peripheral face of said pitch pulley and spaced therefrom, a pair of clutch pins on said portion of said cage in said space, means urging said pins into locking engagement with the peripheral face of said pitch pulley and a cage to prevent rotation of said pulley in either direction, a throttle arm mounted on said throttle pulley for movement thereof, said throttle arm capable of limited rotation relative said throttle pulley and extending between said clutch pins whereby movement of said arm will disengage the clutching action of said pins and rotate said throttle pulley relative said pitch pulley, a first stop means on said cage adapted to be contacted by said throttle arm upon disengagement of said clutch pins and thereby connect said throttle arm to said throttle pulley for rotative movement thereof, a second stop means at the full throttle position of said throttle arm for disengaging a clutch pin when the throttle pulley is rotated to full throttle position, and a casing covering an outer axial face of said pulley and a cam means for disengaging said clutch pins when said throttle arm is retarded to the idle position including a triangular-like welge mounted for a limited lengthwise movement on said throttle arm and having a base adapted for forced entry between said clutch pins to disengage them from their locking action, said casing having a camming track, a cam pin on said triangular-like wedge extending into said track, said camming track having a curve extending from idle to full closed throttle position of said throttle pulley for urging the base of said triangular-like wedge between said clutch pins and disengage them thereby from their locking action.

2. The device of claim 1 including a platform mounted on said cage portion supporting said clutch pins and adjusting means in said cage portion engaging said platform for varying the position of said clutch pins and the degree of their locking action thereby.

References Cited in the file of this patent

UNITED STATES PATENTS

| 2,318,260 | Sikorsky | May 4, 1943 |
| 2,768,504 | Wente | Oct. 30, 1956 |
| 2,847,872 | Todd | Aug. 19, 1958 |
| 2,881,635 | Greene | Apr. 14, 1959 |
| 2,960,167 | Amelio | Nov. 15, 1960 |

FOREIGN PATENTS

| 364,510 | Great Britain | Jan. 7, 1959 |